US012377299B2

(12) United States Patent
Wisegerber

(10) Patent No.: US 12,377,299 B2
(45) Date of Patent: Aug. 5, 2025

(54) FIRE CONTAINMENT CONNECTOR

(71) Applicant: Wildfire Fight, LLC, Houston, TX (US)

(72) Inventor: Lester Ray Wisegerber, Dayton, TX (US)

(73) Assignee: Wildfire Fight, LLC, Houston, TX (US)

( * ) Notice: Subject to any disclaimer, the term of this patent is extended or adjusted under 35 U.S.C. 154(b) by 0 days.

(21) Appl. No.: 18/637,141

(22) Filed: Apr. 16, 2024

(65) Prior Publication Data

US 2024/0293690 A1 Sep. 5, 2024

(51) Int. Cl.

*A62C 3/02* (2006.01)
*A62C 33/06* (2006.01)
*A62C 99/00* (2010.01)

(52) U.S. Cl.

CPC ............ *A62C 3/0264* (2013.01); *A62C 33/06* (2013.01); *A62C 99/0072* (2013.01)

(58) Field of Classification Search

CPC ....... A62C 3/0264; A62C 33/06; A62C 33/04; A62C 2/08; A62C 31/02; B05B 1/1672; B05B 1/326; F16L 37/107; F16L 37/24

USPC ...................................... 169/46, 45; 104/275

See application file for complete search history.

(56) References Cited

U.S. PATENT DOCUMENTS 2,176,699 A * 10/1939 Anderson ................ A62C 2/08 239/525
2,388,334 A * 11/1945 Leinweber ............ B05B 1/1672 239/581.1
3,033,470 A * 5/1962 Choitz .................... B05B 1/042 239/207

(Continued)

FOREIGN PATENT DOCUMENTS

CN 205213645 U * 5/2016
CN 213192215 U 5/2021

(Continued)

OTHER PUBLICATIONS

Red Fire Hose Leaking. [online] [video]. Pond5 Stock Video Item ID: 20495196 [retrieved on Feb. 13, 2024]. Retrieved from the Internet: <URL: https://www.pond5.com/stock-footage/item/20495196-red-fire-hose-leaking>.

(Continued)

*Primary Examiner* — Arthur O. Hall
*Assistant Examiner* — Kevin Edward Schwartz
(74) *Attorney, Agent, or Firm* — William R. Childs; Childs Patent Law PLLC

(57) ABSTRACT

Described herein is a fire containment connector. It includes a female end to connect with a male coupling on a first fire hose and a male end to connect with a female coupling on a second fire hose. The fire containment connector also includes a cylindrical base that routes water from the first fire hose to the second fire hose. A cylindrical section of a sleeve rotates about a main body of the cylindrical base until (Continued)

300 the fire containment connector is in an open position. An oblong opening in the main body allows water to exit the cylindrical base and enter a hollow protuberance of the sleeve when the oblong opening and the hollow protuberance are aligned. A curved slit in the hollow protuberance expels a fan-shaped spray of water and a wall of water is formed.

20 Claims, 5 Drawing Sheets

(56) References Cited

U.S. PATENT DOCUMENTS

| | | | | | |
|---|---|---|---|---|---|
| 4,836,291 | A * | 6/1989 | Owens | A62C 3/06 169/48 |
| 5,158,254 | A * | 10/1992 | Remby | B05B 15/00 248/156 |
| 6,193,170 | B1 | 2/2001 | Fitzgerald | |
| 7,611,081 | B2 | 11/2009 | Partee | |
| 8,308,082 | B2 | 11/2012 | Ivy | |
| 9,511,246 | B2 | 12/2016 | Cordani | |
| 9,764,174 | B2 | 9/2017 | Howard, Sr. | |
| 11,207,554 | B2 | 12/2021 | Hillinger | |
| 11,857,817 | B2 | 1/2024 | Agan | |
| 2005/0023005 | A1 | 2/2005 | Log | |
| 2005/0189436 | A1* | 9/2005 | Shanklin | B05B 7/2443 239/525 |
| 2006/0255187 | A1* | 11/2006 | Rust | F16K 27/067 239/548 |
| 2007/0181712 | A1* | 8/2007 | Ivy | A62C 31/02 239/251 |
| 2008/0060824 | A1* | 3/2008 | Partee | A62C 31/02 169/48 |
| 2011/0226497 | A1* | 9/2011 | Yamodo | A62C 2/08 169/45 |
| 2012/0006419 | A1* | 1/2012 | Richardson | F16L 37/252 137/15.01 |
| 2021/0062952 | A1* | 3/2021 | De Nora | F16L 37/122 |
| 2021/0170211 | A1* | 6/2021 | Valenzuela | F16K 11/205 |

FOREIGN PATENT DOCUMENTS

| | | | | |
|---|---|---|---|---|
| DE | 102020123566 A1 * | 3/2022 | B05B 15/652 |
| KR | 200416765 Y1 | 5/2006 | |

OTHER PUBLICATIONS

3" Aluminum Coupling Set. Datasheet [online]. O's Custom Hose [retrieved on May 30, 2024]. Retrieved from the Internet: <URL: https://oscustomhose.com/3-aluminum-coupling-set/>.

* cited by examiner

100

200

300

300

600

FIRE CONTAINMENT CONNECTOR

TECHNICAL FIELD

The present disclosure relates generally to techniques for wildfire containment. More specifically, the present techniques relate to a fire containment connector that is used to form a wall of water in the path of an advancing wildfire.

BACKGROUND ART

Various techniques are used to contain wildfires. Firefighters use single stream hoses to deliver water to the base of a wildfire. Other containment techniques utilize control lines and controlled burns. A control line is a natural or man-made boundary that firefighters use to limit the spread of a wildfire. Firefighters start controlled burns that consume wildfire-sustaining fuel such as grass, plants, bushes, dried leaves, pine needles, and timber. Controlled burns are intended to eliminate fuel before a wildfire can reach it. Burnouts and backburns are examples of controlled burns. A burnout is a small fire that removes fuel just inside a control line. A backburn is a blaze started inside a control line and downwind of a wildfire. The blaze moves toward the wildfire and burns fuel between the wildfire and the control line.

BRIEF DESCRIPTION OF THE DRAWINGS

The same numbers are used in the disclosure and the figures to reference like features. Numbers in the 100s refer to features originally found in FIG. 1; numbers in the 200s refer to features originally found in FIG. 2; and so on.

DETAILED DESCRIPTION

Figure 1:
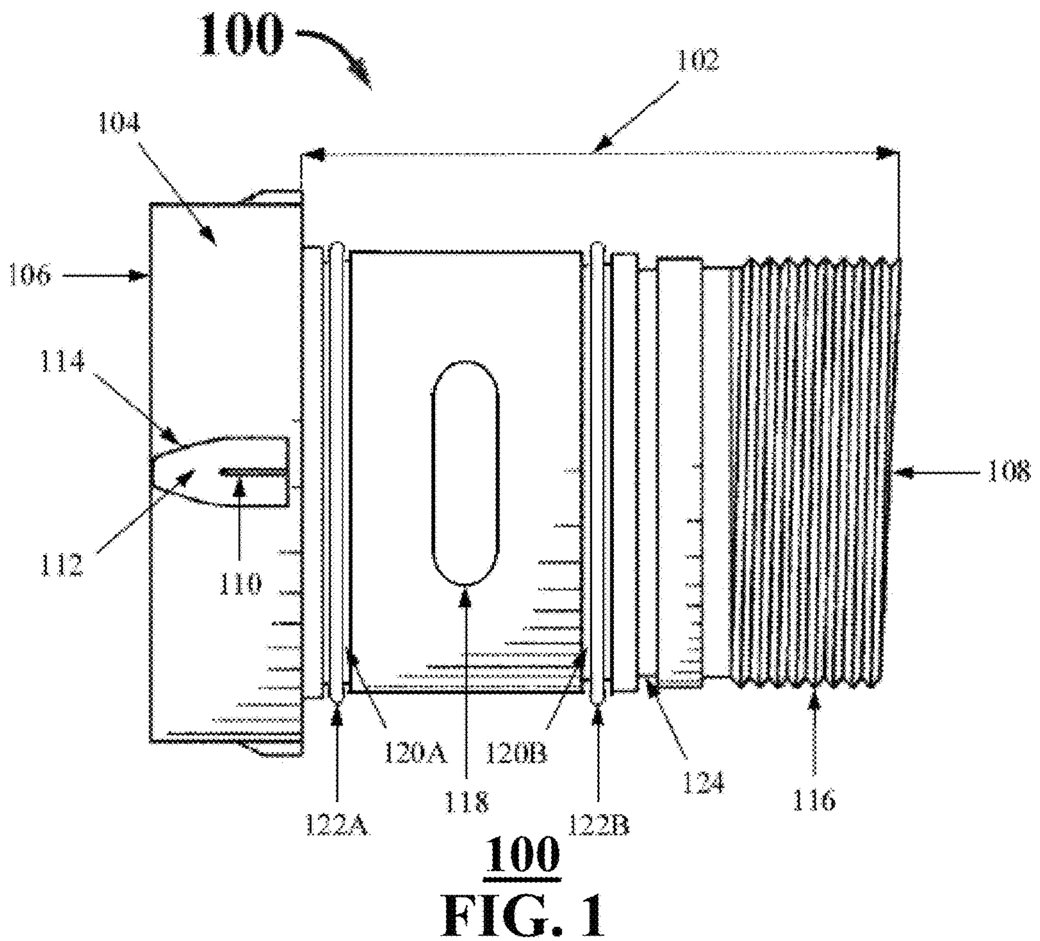
FIG. 1 is an illustration of the cylindrical base of the fire containment connector.

The National Interagency Fire Center ("NIFC") has reported that 55,571 wildfires in the United States scorched 2,633,636 acres in 2023. In addition, these wildfires emitted approximately 5.7 billion tons of carbon dioxide ("$CO_2$") into the atmosphere. This situation is especially concerning because $CO_2$ emitted from wildfires contributes to global warming, creating conditions that result in more wildfires and even greater $CO_2$ emissions. These statistics emphasize the need for wildfire containment techniques that supplement those techniques already in use.

The various containment techniques may have limited effectiveness for a number of reasons. For example, the use of single stream hoses is not a comprehensive approach to containing wildfires. Only small sections of a wildfire's periphery are contained using this technique while other sections continue to blaze. The use of single stream hoses is resource-intense. Numerous firefighters are needed to manipulate the heavy fire hoses. Furthermore, a considerable amount of equipment is required to support the firefighters' efforts. Accordingly, the use of single stream hoses may divert personnel and equipment from more critical areas of a wildfire.

Control lines are positioned where they can intercept an advancing wildfire. Their placement is determined by considering a variety of factors that affect wildfire behavior. A change in any of these factors may have an unpredictable effect on a wildfire. For example, embers may be carried aloft and ignite new fires on the other side of a control line.

Burnouts and backburns are fires intentionally started by firefighters. These fires are intended to limit the fuel available to a wildfire. However, despite precautions, there is always a risk that burnouts and backburns will escalate unexpectedly and become uncontrollable. They may cross control lines, extend the reach of a wildfire, and pose a threat to nearby communities.

There is always a risk to firefighters when they implement a wildfire confinement technique. For example, firefighters using single stream hoses may expose themselves to intense heat, smoke, and flames if they get too close to a wildfire. Firefighters are at risk during ignition and control of burnouts and backburns. The unpredictability of wildfires can add to the danger faced by firefighters when they apply any of the containment techniques. Additional wildfire containment techniques are needed to reduce the risks to firefighters and nearby populated areas.

The present disclosure describes additional techniques for containing wildfires that diminish the danger to firefighters and nearby communities. For example, a fire containment connector may have a female end to connect with a male coupling on a first fire hose. A male end may connect with a female coupling on a second fire hose. The fire containment connector may include a cylindrical base that routes water from the first fire hose to the second fire hose. A cylindrical section of a sleeve may rotate about a main body of the cylindrical base until the fire containment connector is in an open position. An oblong opening in the main body may allow water to exit the cylindrical base and enter a hollow protuberance of the sleeve when the oblong opening and the hollow protuberance are aligned. A curved slit and angled holes in the hollow protuberance may expel a fan-shaped spray of water and form a wall of water. Various examples of the present techniques are described below with reference to the accompanying figures.

FIG. 1 is an illustration of the cylindrical base of the fire containment connector. The cylindrical base 100 may be cast from a metal alloy. It is open at both ends and may have a main body 102 and a circumferential band 104. The cylindrical base 100 may have a female end 106 that connects with a male coupling on a first fire hose and a male end 108 that connects with a female coupling on a second fire hose. A plurality of lugs may extend from the outermost surface of the circumferential band 104 and one lug has a mark 110 on its face 112 and is an indicator lug 114. The connections between the cylindrical base 100 and the first and second fire hoses may be tightened by rotating the cylindrical base 100 using the plurality of lugs. The cylindrical base 100 may route water from the first fire hose to the second fire hose.

The main body 102 of the cylindrical base 100 may contain a first groove 120A and a second groove 120B. A first O-ring 122A may fit in the first groove 120A and a second O-ring 122B may fit in the second groove 120B. The first O-ring 122A and the second O-ring 122B may be lubricated to facilitate rotation of a sleeve 200 about the main body 102. A third groove 124 may be located between the second groove 120B and the plurality of external grooves 116. A snap ring may fit in the third groove 124 to hold a cylindrical section of a sleeve against the circumferential band 104.

The cylindrical section of the sleeve may rotate about the main body 102 of the cylindrical base 100 until the fire containment connector is in an open position. In the open position, an oblong opening 118 in the main body 102 may be aligned with a hollow protuberance of the sleeve. As a result, water may exit the cylindrical base 100 and enter the hollow protuberance via the oblong opening 118.

Figure 2:
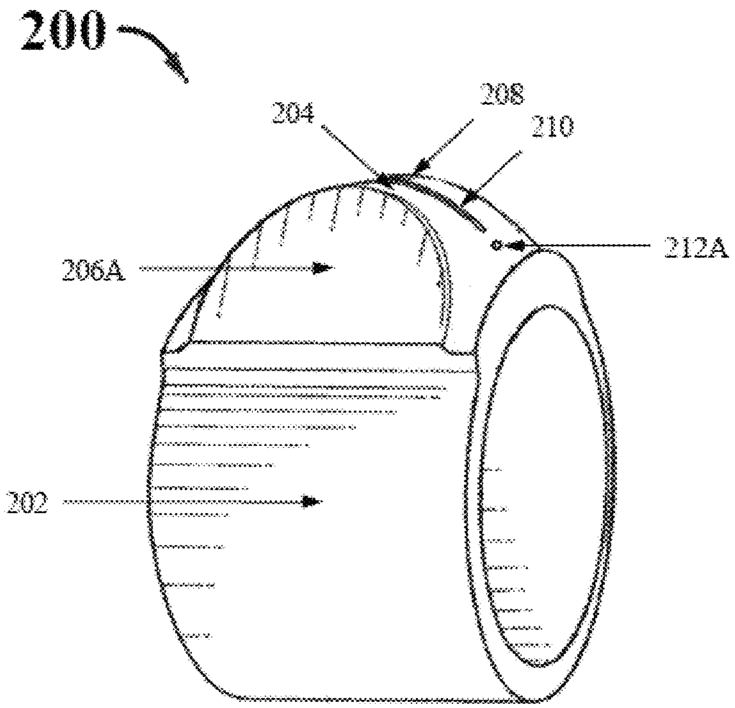
FIG. 2 is an illustration of the sleeve that rotates about the cylindrical base shown in FIG. 1.

FIG. 2 is an illustration of the sleeve that rotates about the cylindrical base shown in FIG. 1. The sleeve 200 may be cast from the same metal alloy as the cylindrical base 100. The sleeve may have a cylindrical section 202 and a hollow protuberance 204. The cylindrical section 202 may be open at both ends.

The sleeve 200 may slip over the plurality of external grooves 116 at the male end 108 of the cylindrical base 100 and move along the main body 102. The circumferential band 104 at the female end 106 of the cylindrical base 100 may stop translational movement of the sleeve 200 along the main body 102. An outer diameter of the circumferential band 104 may extend beyond an outer diameter of the main body 102 and stops translational movement of the sleeve 200 when the sleeve 200 contacts the circumferential band 104. The cylindrical section 202 of the sleeve 200 may be held against the circumferential band 104 by a snap ring that fits in the third groove 124 in the main body 102.

The hollow protuberance 204 of the sleeve 200 may be formed from two flat sides that are parabolic in shape, angled toward each other, and separated by an arch 208. Only one flat side 206A and part of the arch 208 are shown in FIG. 2. The arch 208 in the hollow protuberance 204 may include two angled holes located at each end of the curved slit 210. Only one angled hole 212A is shown in FIG. 2. The oblong opening 118 in the main body 102 may route water from the cylindrical base 100 into the hollow protuberance 204 when the oblong opening 118 and the hollow protuberance 204 are aligned. The curved slit 210 and the angled holes in the arch 208 may expel a fan-shaped water spray and form a wall of water when the curved slit 210 is aligned with the mark 110 on the face 112 of the indicator lug 114. The wall of water saturates an area in the path of an advancing wildfire and robs the advancing wildfire of fuel, hinders a spread of embers, and limits the number of ember-initiated fires.

Figure 3:
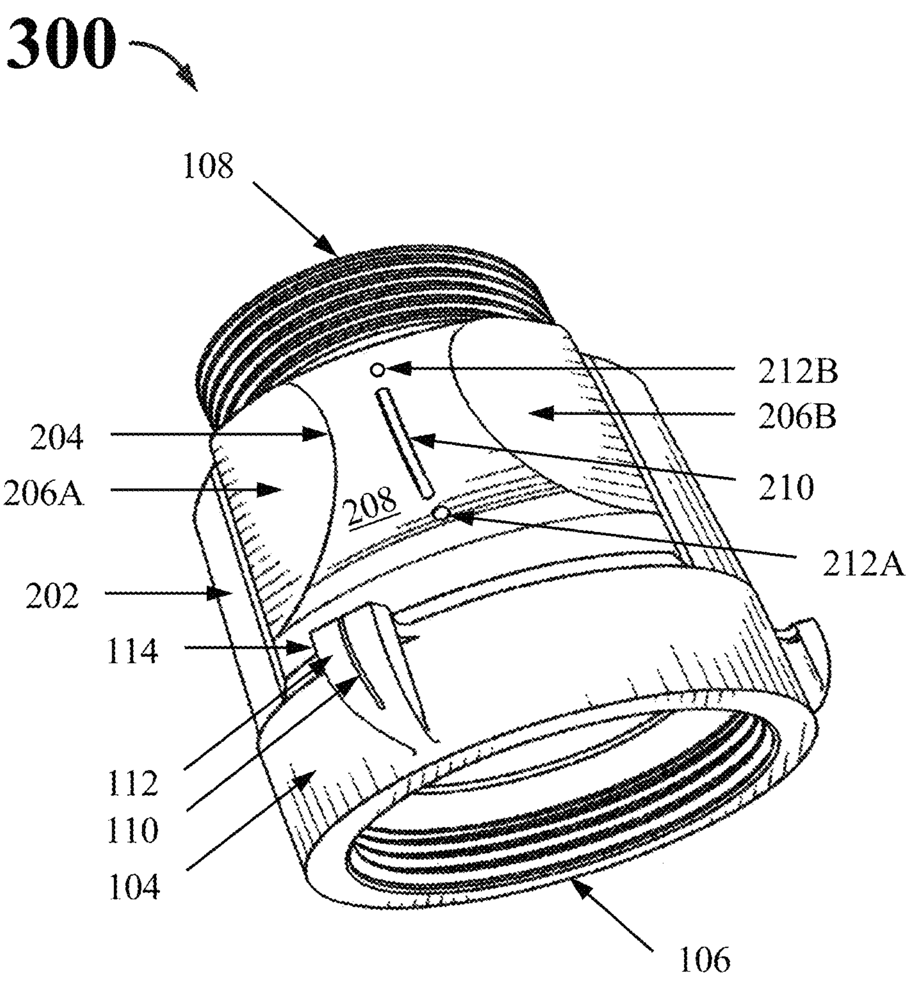
FIG. 3 is an illustration of the assembled fire containment connector.

FIG. 3 is an illustration of the assembled fire containment connector. The cylindrical section 202 of the sleeve 200 has been slipped over the male end 108 of the cylindrical base 100 and moved along the main body 102 until stopped by the circumferential band 104. It may be held in place by the snap ring in the third groove 124 located in the main body 102 of the cylindrical base 100. Accordingly, translational movement of the cylindrical section 202 is prevented.

The structure of the hollow protuberance 204 is shown in FIG. 3. The hollow protuberance 204 may include a first flat side 206A, a second flat side 206B, and an arch 208. The first flat side 206A and the second flat side 206B may be parabolic in shape, angled toward each other, and separated by the arch 208. This configuration may enclose an empty space that is part of the hollow protuberance 204. The arch 208 may contain the curved slit 210, the first angled hole 212A located at one end of the curved slit 210, and the second angled hole 212B located at the opposite end of the curved slit 210.

Water may enter the hollow protuberance 204 from the oblong opening 118 in the main body 102 of the cylindrical base 100 when the hollow protuberance 204 and the oblong opening 118 are aligned. A fan-shaped water spray may be expelled from the curved slit 210, the first angled hole 212A, and the second angled hole 212B. A wall of water may be formed. The curved slit 210 in the hollow protuberance 204 may align with the mark 110 on the indicator lug 114 when the hollow protuberance 204 and the oblong opening 118 are aligned.

Rotation of the cylindrical section 202 of the sleeve 200 about the main body 102 may increase a separation between the curved slit 210 and the mark 110 on the indicator lug 114, decrease a height of the wall of water, and increase a saturation distance of the wall of water, provided all other factors that affect the wall of water (e.g., water pressure, wind speed, and wind direction) remain the same. Continued rotation of the cylindrical section 202 may move the hollow protuberance 204 past the oblong opening 118 and stop the curved slit 210, the first angled hole 212A, and the second angled hole 212B from expelling water causing the wall of water to collapse.

An additional fire containment connector can join a plurality of fire hoses such that overlapping fan-shaped water sprays from the fire containment connector 300 and the additional fire containment connector can form a continuous wall of water. One end of the plurality of fire hoses may be a capped fire containment connector 300. The other end may be an open end of a fire hose (i.e., it is not joined to a fire containment connector 300). The open end of the fire hose may be connected to a pump that supplies water to the plurality of fire hoses.

Water introduced into the plurality of fire hoses when the oblong openings 118 and the hollow protuberances 204 are aligned may be expelled from the curved slits 210, the first angled holes 212A, and the second angled holes 212B in an upward-directed spray. The cylindrical sections 202 of the sleeves 200 may be rotated about the main bodies 102 of the cylindrical bases 100 until water exits the curved slits 210, the first angled holes 212A, and the second angled holes 212B at a desired angle. The continuous wall of water may have a height of approximately 32 to 37 feet and a saturation distance of approximately 30 to 35 feet provided all other factors that affect the continuous wall of water (e.g., water pressure, wind speed, and wind direction) remain the same.

The female end 106 and the male end 108 of the fire containment connector 300 may form a leak-resistant connection with a coupling on a third fire hose and a fourth fire hose when the female end 106, the male end 108, and the coupling have a same thread type. In the United States, the most common thread type used for fire hose couplings is the National Standard Thread or "NST." Accordingly, the female end 106 and the male end 108 of the fire containment connector 300 may have National Standard Threads so that leak-resistant connections are formed with fire hose couplings that have National Standard Threads. Other thread types used in the U.S. may include National Pipe Straight Hose ("NPSH") threads and specialty threads. These thread types should be National Fire Protection Association ("NFPA") compliant. In addition, the ends of a fire containment connector 300 may have thread types that fit fire hose couplings commonly used in other countries.

Because of the different thread types used domestically and internationally, the process for casting fire containment connectors 300 should be flexible and adaptable. The process should have the ability to produce fire containment connectors 300 whose ends have the various thread types discussed above. The thread type should not interfere with the functioning of the fire containment connector 300.

The fire containment container 300 may be joined to fire hoses whose couplings incorporate both threads and a locking mechanism. The threads may create a leak-resistant connection, while the locking mechanism may maintain the integrity of the connection. Locking mechanisms only modify fire hose couplings. A locking mechanism should not interfere with the functioning of the fire containment connector 300.

In the implementation discussed above, water enters the hollow protuberance 204 from the oblong opening 118 when the hollow protuberance 204 and the oblong opening 118 are aligned. Water is expelled from the curved slit 210, the first angled hole 212A, and the second angled hole 212B in the hollow protuberance 204 and a wall of water is formed. In another implementation, water can be replaced by a fire suppressant, the fire suppressant can enter the hollow protuberance 204 and be expelled from the curved slit 210, the first angled hole 212A, and the second angled hole 212B and a wall of suppressant can be formed.

Figure 4:
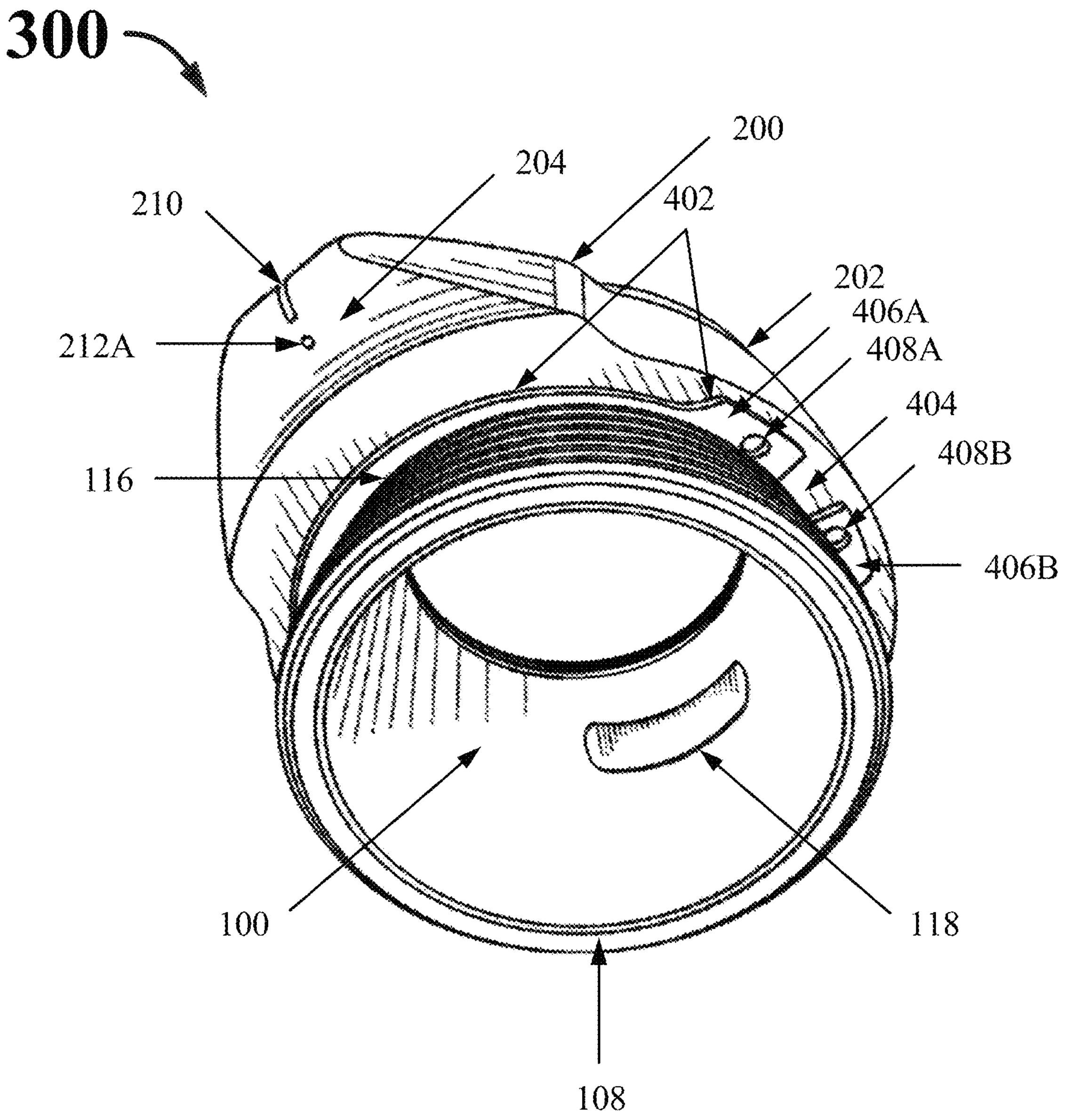
FIG. 4 is a flow-through view of the assembled fire containment connector shown in FIG. 3.

FIG. 4 is a flow-through view of the assembled fire containment connector shown in FIG. 3. The cylindrical section 202 of the sleeve 200 has been slipped over the plurality of external grooves 116 at the male end 108 of the cylindrical base 100. The sleeve 200 has been moved along the main body 102 until it rests against the circumferential band 104. A snap ring 402 has been placed in the third groove 124 to prevent translational movement of the sleeve 200.

The snap ring 402 is circular in shape so that it fits in the third groove 124. The snap ring 402 has a gap 404 in it. The ends 406A, 406B of the snap ring 402 extend beyond the third groove 124. Each end 406A, 406B has a hole 408A, 408B in it. The holes 408A, 408B are used during installation and removal of the snap ring 402.

To use the fire containment connector 300, the sleeve 200 may be rotated until the oblong opening 118 and the hollow protuberance 204 are aligned. Water is introduced into the cylindrical base 100 and enters the hollow protuberance 204 via the oblong opening 118. Water flowing into the hollow protuberance 204 may be the source of the upward-directed spray that is expelled from the curved slit 210, the first angled hole 212A, and the second angled hole 212B (not shown).

Figure 5:
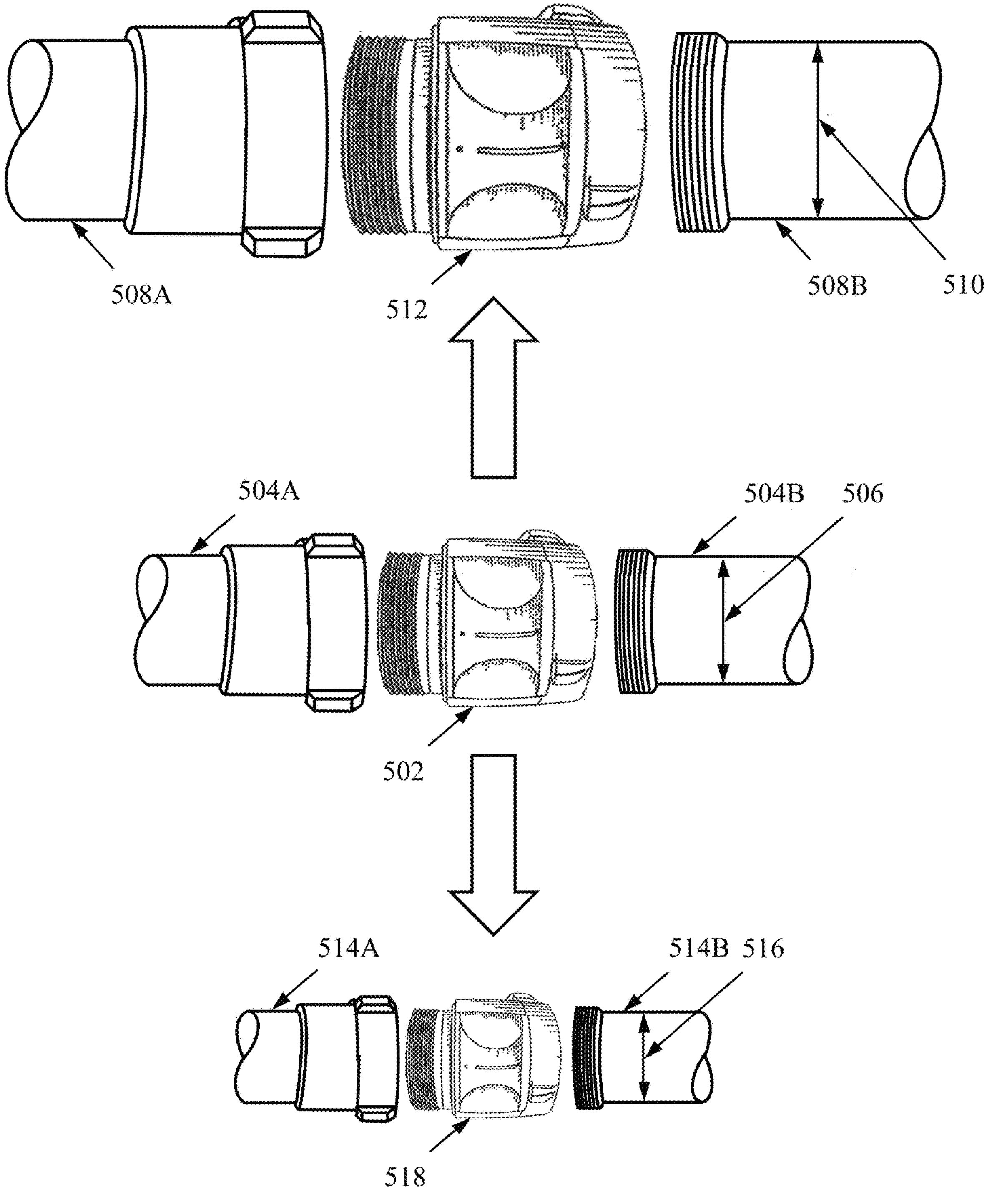
FIG. 5 depicts fire containment connectors that are cast to join fire hoses of differing diameters.

FIG. 5 depicts fire containment connectors that are cast to join fire hoses of differing diameters. A first fire containment connector may be cast to join a first pair of fire hoses having a first diameter. In an implementation, the dimensions of a second fire containment connector 502 are such that the second fire containment connector 502 may join a second pair of fire hoses 504A, 504B that have a second diameter 506. It may be necessary to join a third pair of fire hoses 508A, 508B that have a third diameter 510 that exceeds the second diameter 506. A third fire containment connector 512 that is appropriately dimensioned may be cast from the metal alloy. The dimensions of the third fire containment connector 512 are not necessarily determined by proportionally scaling up the dimensions of the second fire containment connector 502.

Alternatively, it may be necessary to join a fourth pair of fire hoses 514A, 514B that have a fourth diameter 516 that is exceeded by the second diameter 506. A fourth fire containment connector 518 that is appropriately dimensioned may be cast from the metal alloy. The dimensions of the fourth fire containment connector 518 are not necessarily determined by proportionally scaling down the dimensions of the second fire containment connector 502.

For example, the second fire containment connector 502 may join fire hoses that have a diameter of 2½ inches (i.e., the diameter of fire hoses used to contain wildfires). The third fire containment connector 512 may be cast to connect to fire hoses having a diameter of 6 inches. The fourth fire containment connector 518 may be cast to connect to fire hoses having a diameter of 1 inch. The size of the wall of water may change because the third fire containment connector 512 and the fourth fire containment connector 518 have dimensions that differ from the dimensions of the second fire containment connector 502.

Figure 6:
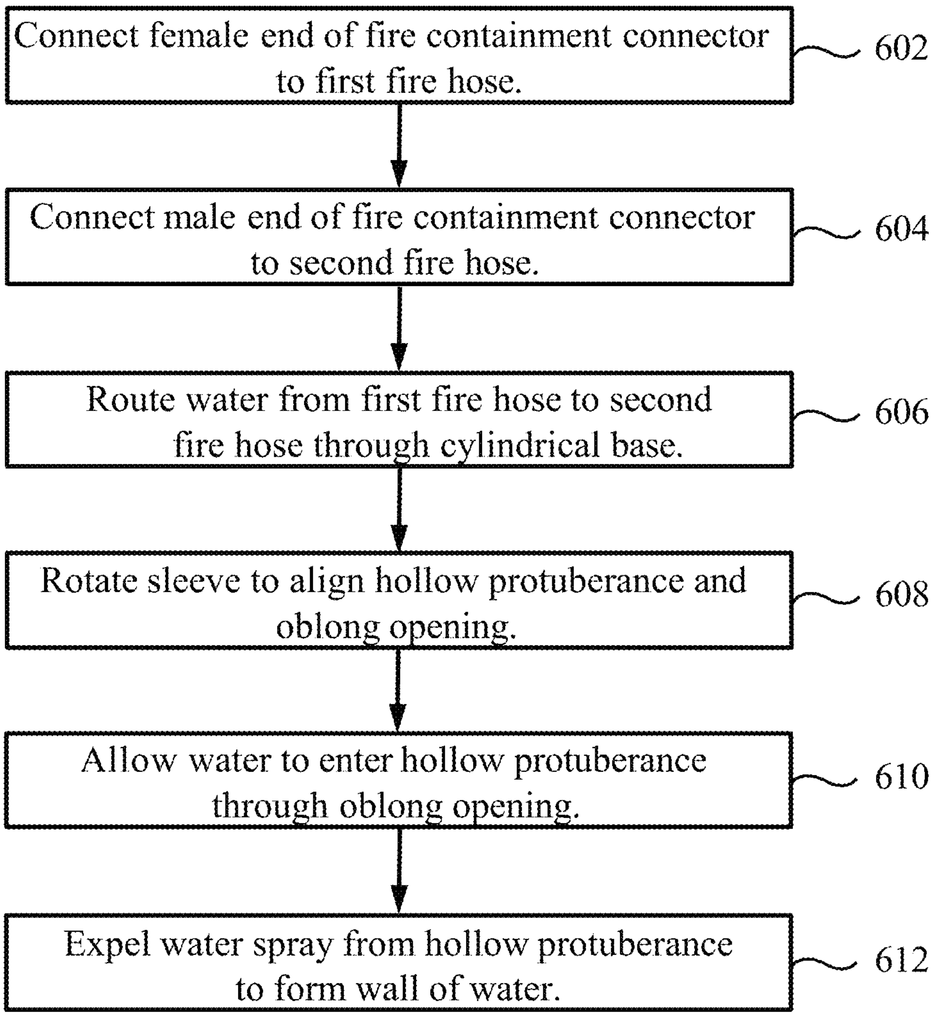
FIG. 6 is a process flow diagram of a method for containing a wildfire using the fire containment connector shown in FIGS. 3 and 4.

FIG. 6 is a process flow diagram of a method for containing a wildfire using the fire containment connector shown in FIGS. 3 and 4. At block 602, the female end 106 of the fire containment connector 300 may be connected to the male coupling on a first fire hose. At block 604, the male end 108 of the fire containment connector 300 may be connected to the female coupling on a second fire hose. At block 606, water may be routed from the first fire hose to the second fire hose through a cylindrical base 100 of the fire containment connector 300.

At block 608, a cylindrical section 202 of a sleeve 200 may be rotated about a main body 102 of the cylindrical base 100. The cylindrical section 202 may be rotated until a hollow protuberance 204 of the sleeve 200 is aligned with an oblong opening 118 in the main body 102. At block 610, water may enter the hollow protuberance 204 through the oblong opening 118. At block 612, a fan-shaped water spray may be expelled from a curved slit 210, a first angled hole 212A, and a second angled hole 212B in the hollow protuberance 204 and a wall of water may be formed. The wall of water may saturate an area in the path of an advancing wildfire and rob the advancing wildfire of fuel. Furthermore, the wall of water may hinder the spread of embers and limit the number of ember-initiated fires.

Aligning the curved slit 210 in the arch 208 of the hollow protuberance 204 with the mark 110 on the indicator lug 114 may open the fire containment connector 300. Rotating the cylindrical section 202 of the sleeve 200 about the main body 102 may increase a separation between the curved slit 210 and the mark 110 on the indicator lug 114, decrease a height of the wall of water, and increase a saturation distance of the wall of water, provided all other factors that affect the wall of water (e.g., water pressure, wind speed, and wind direction) remain the same. Continuing rotation of the cylindrical section 202 may move the hollow protuberance 204 past the oblong opening 118. The curved slit 210, the first angled hole 212A, and the second angled hole 212B may cease to expel water and the wall of water collapses.

Replacing water with a fire suppressant may result in the fire suppressant entering the hollow protuberance 204. The fire suppressant may be expelled from the curved slit 210, the first angled hole 212A, and the second angled hole 212B and a wall of suppressant may be formed.

The fire containment connector is integral to the formation of a wall of water that diminishes the likelihood that a wildfire will spread. Fire hoses are joined by the fire containment connector well in advance of the occurrence of a wildfire. The fire hoses may be joined to form segments of a certain length. The frequency and severity of wildfires in the surrounding area may determine the length of a segment and the number of segments needed. In an example, a smaller fire department in an area that has occasional small brush fires may need one or two segments that are a few hundred feet in length. In another example, a larger fire department in an area that has frequent wildfires may require multiple segments that are 500 to 5,000 feet in length. One end of the joined fire hoses may be a fire containment connector that is capped. The other end may be an open end of a fire hose that may be connected to a pump that supplies water to the joined fire hoses.

Each fire containment connector may be inspected to make sure it is open before it is added to a segment. The position of the indicator lug may make it easy to determine if a fire containment connector is open. If the mark on the indicator lug is aligned with the curved slit, the oblong opening in the main body of the cylindrical base is aligned with the hollow protuberance and the fire containment connector is open. If the mark on the indicator lug is not aligned with the curved slit, rotating the sleeve about the main body brings them into alignment and opens the fire containment connector.

The segments may be racked (i.e., loaded) on a transport vehicle. Each fire hose may be added to the transport vehicle in a "lay flat" position which is the optimal hose racking method because it results in quick offloading of the fire hoses. After all the segments have been loaded, the transport vehicle is ready for deployment and may be stored until needed.

The transport vehicle may be deployed in the event of a wildfire. At a control line located in advance of the approaching wildfire, the segments may be unloaded from the transport vehicle. If the fire hoses were properly racked, the segments may be unloaded without kinking or tangling. The segments may be positioned as needed for saturation to begin in advance of the approaching wildfire so that the wildfire is contained when it reaches the saturated control line.

The transport vehicle may be met at the site by a source of water. For example, a pumper truck, a tanker, a tinder, or a dump tank containing water may arrive at the site of the wildfire. Built-in pumps or portable pumps may move water to the connected segments. Alternatively, water may be supplied from natural sources such as rivers, lakes, and ponds. Portable pumps may be used to transfer water from a natural source to the connected segments.

The pumps may be turned on and water is expelled from the curved slits, the first angled holes, and the second angled holes in an upward-directed spray. A firefighter may rotate the sleeves on the fire containment connectors until water sprays from the curved slits, the first angled holes, and the second angled holes at a desired angle and a wall of water is created. Alternatively, individual sleeves may be rotated by different amounts and water exits the curved slits, the first angled holes, and the second angled holes at different angles. Hence, the sleeves on the fire containment connectors may be adjusted as needed to contend with the changing periphery of a wildfire. Stakes may be used to stabilize the fire containment connectors so that the positions of the sleeves may be maintained.

Flexibility can be introduced into the use of fire hoses joined by the fire containment connector in ways other than those described above. For example, double connectors may be placed between fire hoses. One of the two fire containment connectors may expel water in one direction while the other may expel water in the opposite direction. As a result, the saturation distance may increase to approximately 60 feet or more. Some of the fire containment connectors may be turned off only if water is needed farther down the line of connected fire hoses. Furthermore, use of the fire containment connector is not limited to containing wildfires. It may be used to fight fires in industrial, commercial, and residential areas.

There are a number of benefits that may be gained by the use of fire hoses joined by the fire containment connector. For example, the connected fire hoses may be deployed at night or in high winds when the use of other equipment may be limited. Furthermore, water may be expelled from the curved slits, the first angled holes, and the second angled holes at high pressure. As a result, the wall of water may extend a considerable distance from the fire hoses joined by the fire containment connector. Firefighters may remain behind the wall of water and minimize their exposure to intense heat, smoke, and flames.

Numerous firefighters may fight a wildfire only in limited areas when implementing conventional fire containment techniques. Furthermore, a considerable amount of equipment may be required to support the firefighters' efforts. The use of the fire containment connector may result in fire containment techniques that use less resources and cover more area. A few firefighters using a reduced amount of equipment may cover as much as 5,000 linear feet with a width up to 60 feet or more when fire hoses joined by the fire containment connector are deployed. Accordingly, firefighters and equipment may become available to fight the same wildfire in other areas or a different wildfire located elsewhere. As a result, fewer acres may be destroyed and less carbon dioxide may be emitted into the atmosphere.

Reference to "an example," "another example," "an implementation," or "another implementation" means that a particular feature is included in at least some examples or implementations, but not necessarily in all examples or implementations, of the present techniques. The various occurrences of "an example" or "an implementation" are not necessarily referring to the same example or implementation.

Not all features described and illustrated herein need to be included in a particular embodiment or embodiments. For example, if the Specification states a feature "may" be included, that particular feature is not required to be included. If the Specification refers to "a" feature, that does not mean there is only one of the feature.

Some embodiments have been described by referring to particular examples or implementations. However, other examples and implementations are possible. The examples and implementations of the present techniques are not limited to those disclosed herein. Additionally, the arrangement of the features and the sequence of the blocks described above or illustrated in the drawings do not need to be arranged or sequenced in the particular way described or illustrated. Other arrangements or sequences are possible.

Features shown in the drawings may have the same reference number to suggest that the features are similar. Alternatively, features shown in the drawings may have different reference numbers to suggest that the features are different. However, a feature may be flexible enough to be present in some or all of the examples or implementations described above or shown in the drawings. Various features described herein or depicted in the drawings may be designated a first feature, a second feature, etc. The designation of a feature as the first feature, the second feature, etc. is arbitrary.

Details of an aforementioned example or implementation may apply to one or more embodiments. For example, all optional features of the fire containment connector may be included in the method described above. Furthermore, a process flow diagram has been used herein to describe an embodiment. However, the present techniques are not limited to that diagram or the corresponding description. For example, the process exemplified in the diagram does not need to progress through each block or in exactly the same order as illustrated.

The present techniques are not restricted to the particular details described herein. Those skilled in the art having the benefit of this disclosure will appreciate that many other variations of the foregoing descriptions and accompanying drawings are possible and remain within the scope of the present techniques. Accordingly, the scope of the present techniques is defined by the following claims and any amendments thereto.

What is claimed is:

1. A fire containment connector, comprising:
- a female end to connect with a male coupling on a first fire hose;
- a male end to connect with a female coupling on a second fire hose;
- a cylindrical base to route water from the first fire hose to the second fire hose;
- a sleeve to slip over the male end and move along a main body of the cylindrical base;
- a first flat side parabolic in shape and a second flat side parabolic in shape, acutely angled toward each other, and separated by a connected solid arch to form a hollow protuberance of the sleeve;
- a cylindrical section of the sleeve to rotate about the main body of the cylindrical base until the fire containment connector is in an open position;
- an oblong opening in the main body of the cylindrical base to route water from the cylindrical base into the hollow protuberance of the sleeve when the oblong opening in the main body and the hollow protuberance of the sleeve are aligned; and
- a curved slit, a first angled hole, and a second angled hole in the arch of the hollow protuberance of the sleeve to expel a fan-shaped water spray and form a wall of water.

2. The fire containment connector of claim 1, wherein the wall of water saturates an area in a path of an advancing wildfire and robs the advancing wildfire of fuel, hinders a spread of embers, and limits a number of ember-initiated fires.

3. The fire containment connector of claim 1, comprising a circumferential band at the female end and wherein an outer diameter of the circumferential band at the female end extends beyond an outer diameter of the main body of the cylindrical base to stop translational movement of the sleeve.

4. The fire containment connector of claim 3, comprising a plurality of lugs that extend from an outermost surface of the circumferential band at the female end and wherein one of the plurality of lugs is an indicator lug with a mark on its face.

5. The fire containment connector of claim 3, wherein the cylindrical section of the sleeve is held against the circumferential band at the female end by a snap ring that fits in a groove in the main body of the cylindrical base.

6. The fire containment connector of claim 1, comprising a first groove and a second groove in the main body of the cylindrical base and wherein a first O-ring fits in the first groove and a second O-ring fits in the second groove.

7. The fire containment connector of claim 6, wherein the first O-ring and the second O-ring are lubricated to facilitate a rotation of the cylindrical section of the sleeve about the main body of the cylindrical base.

8. The fire containment connector of claim 1, wherein the curved slit aligns with a mark on a indicator lug when the fire containment connector is in the open position.

9. The fire containment connector of claim 8, wherein rotation of the cylindrical section of the sleeve about the main body of the cylindrical base increases a distance between the curved slit and the mark on the indicator lug, decreases a height of the wall of water, and increases a saturation distance of the wall of water.

10. The fire containment connector of claim 9, wherein continued rotation of the cylindrical section of the sleeve about the main body of the cylindrical base moves the hollow protuberance past the oblong opening, stops the curved slit, the first angled hole, and the second angled hole from expelling water, and collapses the wall of water.

11. The fire containment connector of claim 1, wherein the fire containment connector and an additional fire containment connector can join a plurality of fire hoses such that overlapping fan-shaped water sprays from the fire containment connector and the additional fire containment connector can form a continuous wall of water.

12. The fire containment connector of claim 1, wherein the fire containment connector is cast to join a first pair of fire hoses having a first diameter.

13. The fire containment connector of claim 1, wherein the female end and the male end form a leak-resistant connection with a coupling on a third fire hose and a fourth fire hose when the female end, the male end, and the coupling have a same thread type.

14. The fire containment connector of claim 1, wherein water can be replaced by a fire suppressant, the fire suppressant can enter the hollow protuberance and be expelled from the curved slit, the first angled hole, and the second angled hole and a wall of fire suppressant can be formed.

15. A method for using the fire containment connector of claim 1, comprising:
- connecting the female end of the fire containment connector to the male coupling on the first fire hose;
- connecting the male end of the fire containment connector to the female coupling on the second fire hose;
- routing water from the first fire hose to the second fire hose through the cylindrical base of the fire containment connector;
- rotating the cylindrical section of the sleeve about the main body of the cylindrical base until the hollow protuberance of the sleeve is aligned with the oblong opening in the main body;
- allowing water to exit the cylindrical base and enter the hollow protuberance through the oblong opening; and
- expelling a fan-shaped water spray from the curved slit in the hollow protuberance to form a wall of water.

16. The method of claim 15, wherein the wall of water saturates an area in a path of an advancing wildfire and robs the advancing wildfire of fuel and hinders a spread of embers and limits a number of ember-induced fires.

17. The method of claim 15, comprising aligning the curved slit with a mark on an indicator lug to open the fire containment connector.

18. The method of claim 17, comprising rotating the cylindrical section of the sleeve about the main body and increasing a separation between the curved slit and the mark on the indicator lug, decreasing a height of the wall of water, and increasing a saturation distance of the wall of water.

19. The method of claim 18, comprising continuing rotation of the cylindrical section to cause the hollow protuberance to move past the oblong opening, the curved slit to cease expelling water, and the wall of water to collapse.

20. The method of claim 15, comprising replacing water with a fire suppressant, allowing the fire suppressant to enter the hollow protuberance, expelling the fire suppressant from the curved slit, and forming a wall of fire suppressant.

* * * * *